(12) United States Patent
Huver et al.

(10) Patent No.: US 6,506,821 B1
(45) Date of Patent: Jan. 14, 2003

(54) SELF-DISPERSIBLE HARDENABLE EPOXIDE RESINS

(75) Inventors: Thomas Huver, Duesseldorf (DE); Vincenzo Foglianisi, Milan (IT); Horst Sulzbach, Duesseldorf (DE); Tamara Leuschner, Oberhausen (DE)

(73) Assignee: Cognis Deutschland GmbH & Co., KG, Duesseldorf (DE)

( * ) Notice: Subject to any disclaimer, the term of this patent is extended or adjusted under 35 U.S.C. 154(b) by 0 days.

(21) Appl. No.: 09/868,531

(22) PCT Filed: Dec. 10, 1999

(86) PCT No.: PCT/EP99/09737

§ 371 (c)(1),
(2), (4) Date: Aug. 7, 2001

(87) PCT Pub. No.: WO00/37527

PCT Pub. Date: Jun. 29, 2000

(30) Foreign Application Priority Data

Dec. 19, 1998 (DE) .......................... 198 58 920

(51) Int. Cl.$^7$ .......................... C08K 3/20; C08L 63/02
(52) U.S. Cl. .................. 523/404; 523/414; 528/111; 528/405
(58) Field of Search ................. 523/414, 404; 528/111, 405

(56) References Cited

U.S. PATENT DOCUMENTS

| 4,315,044 A | 2/1982 | Elmore et al. |
| 4,608,406 A | 8/1986 | Williams, Jr. et al. |
| 4,769,438 A | 9/1988 | Zimmerman et al. |
| 4,886,845 A | 12/1989 | Becker et al. |
| 5,908,902 A | 6/1999 | Pfeil et al. |

FOREIGN PATENT DOCUMENTS

| DE | 36 43 751 | 6/1988 |
| EP | 0 272 595 | 1/1994 |
| EP | 0 709 418 | 5/1996 |
| EP | 0 747 413 | 12/1996 |
| WO | WO95/18165 | 7/1995 |
| WO | WO96/20971 | 7/1996 |
| WO | WO96/20978 | 7/1996 |

*Primary Examiner*—Robert Dawson
*Assistant Examiner*—D. Aylward
(74) *Attorney, Agent, or Firm*—John E. Drach; Steven J. Trzaska

(57) ABSTRACT

A self-dispersible curable epoxy resin composition containing a reaction product of: (a) 1.0 equivalent of epoxy resin; (b) 0.01 to 1.0 equivalent of polyhydric phenol; and (c) 0.005 to 0.5 equivalent of an amine/epoxy adduct formed by reacting: (i) an aromatic polyepoxide; and (ii) a polyoxyalkylenamine, in an equivalent ratio of from about 1:0.10 to 1:0.28.

13 Claims, No Drawings

SELF-DISPERSIBLE HARDENABLE EPOXIDE RESINS

BACKGROUND OF THE INVENTION

This invention relates to self-dispersible curable epoxy resins based on epoxy/amine adducts, to a process for their production and to the use of these special epoxy resins for coating solid substrates.

For many years, curable epoxy resins have been used as components in coating compositions. However, the properties of coatings produced using aqueous epoxy resin dispersions have long been considered inferior to those of coatings in which the resin is used in the form of a solution in an organic solvent. This was mainly attributed to the fact that the emulsifiers used, for example nonylphenol ethoxylates, migrate to the surface of the film where they adversely affect its properties. One way of solving this problem is to use so-called reactive emulsifiers which, where the epoxy resin is crosslinked with a diamine or polyamine or other hardener, react with the hardener and thus become part of the coating. Aqueous dispersions of special reactive emulsifiers are known from the prior art.

U.S. Pat. No. 4,315,044 describes a stable epoxy resin dispersion containing (1) an aqueous medium and (2) between 50 and 70% by weight of a self-emulsifiable epoxy resin which is the addition product of (a) 40 to 90% by weight of diglycidyl ethers of a dihydric phenol, (b) 5 to 35% by weight of a dihydric phenol and (c) 2 to 15% by weight of the diglycidyl ether of a polyoxyalkylene glycol and in which the molecular weight of the epoxy resin is between 500 and 20,000.

U.S. Pat. No. 4,608,406 describes a stable epoxy dispersion containing (1) an aqueous medium and (2) between 50 and 70% by weight of a self-emulsifiable epoxy resin with a molecular weight of 1,000 to 20,000 which is the addition product of (a) 40 to 90% by weight of diglycidyl ethers of a dihydric phenol, (b) 5 to 35% by weight of a dihydric phenol, (c) 2 to 15% by weight of the diglycidyl ether of a polyoxyalkylene glycol and (d) 2 to 15% by weight of an alkyl phenol/formaldehyde/novolak resin.

EP-B-272 595 and DE-A-36 43 751 describe a process for the production and use of stable aqueous epoxy resin dispersions consisting of a) 50 to 80% by weight of an epoxy compound containing at least two epoxy groups per molecule and having an epoxy equivalent weight of 100 to 2,000, b) 35 to 17% by weight of an aromatic polyol and c) 15 to 3% by weight of a condensation product of an aliphatic polyol with a molecular weight (Mw) of 200 to 20,000 and an epoxy compound containing at least two epoxy groups per molecule and having an epoxy equivalent weight of 100 to 2,000, the equivalent ratio of the OH groups to the epoxy groups being from 1:0.85 to 1:3.5 and the epoxy equivalent weight of this condensation product being from 200 to at least 50,000.

WO 95/18165 (Henkel Corp.) describes a self-dispersible curable epoxy resin obtainable by reacting an epoxy resin (a) with a polyoxyalkylene amine (b) with a molecular weight of 3,000 to 15,000. The components mentioned are used in a ratio of (b) to (a) of 0.001:1.0 to 0.060:1.0 equivalent.

WO 96/20971 (Henkel Corp.) describes a self-dispersible curable epoxy resin obtainable by reacting (a) 1.0 equivalent of epoxy resin, (b) 0.01 to 1.0 equivalent of a polyhydric phenol and (c) 0.005 to 0.5 equivalent of an amine/epoxy adduct. The amine/epoxy adduct is a reaction product of 1.0 equivalent of a polyepoxide and 0.3 to 0.9 equivalent of a polyoxyalkylene diamine.

EP-A-747 413 describes a self-emulsifiable epoxy resin (A) obtainable from (A-1) 50 to 95% by weight of one or more epoxy compound(s) containing at least two epoxy groups per molecule and having an epoxy group content of 300 to 11,200 mmoles/kg, (A-2) 5 to 50% by weight of an aromatic polyol, (A-3) 0 to 25% of modifying compounds containing at least two epoxy-reactive groups, (A-4) 5 to 35% of a condensation product—acting as emulsifier—of (A-4-a) an aliphatic polyol with a weight average molecular weight $M_w$ of 200 to 20,000 g/mole and (A-4-b) an epoxy compound containing at least two epoxy groups per molecule and having an epoxy group content of 500 to 10,000 mmoles/kg, the ratio of the number of OH groups to the number of EP groups being from 1:2 to 1:10 and the epoxy group content of the condensation products (A-4) being from 100 to 6,700 mmoles/kg.

DESCRIPTION OF THE INVENTION

The problem addressed by the present invention was to provide self-dispersible curable epoxy resins. The expression "self-dispersible" in the context of the present invention means that the epoxy resins can be dispersed or emulsified spontaneously in aqueous medium without the use of additional additives, such as emulsifying or dispersing additives. In other words, the epoxy resins to be developed are those which would be capable of self-dispersion and/or self-emulsification in water. In the interests of simplicity, the term "self-dispersing" is used for this property throughout the present specification. Another problem addressed by the invention was to provide aqueous dispersions of self-dispersible curable epoxy resins which would be distinguished by high stability in storage under practical storage conditions. A further problem addressed by the invention was to provide coating compositions containing a self-dispersible curable epoxy resin, the coating obtained from the coating composition after the curing process being distinguished by excellent properties.

It has now surprisingly been found that epoxy resins obtainable by reaction of (a) 1.0 equivalent of epoxy resin, (b) 0.01 to 1.0 equivalent of a polyhydric phenol and (c) 0.005 to 0.5 equivalent of an amine/epoxy adduct, the amine/epoxy adduct being a reaction product of 1.0 equivalent of an aromatic polyepoxide and 0.10 to 0.28 equivalent of a polyoxyalkyleneamine, excellently satisfy the requirements mentioned in every respect.

The present invention relates first to self-dispersible curable epoxy resins obtainable by reaction of (a) 1.0 equivalent of epoxy resin, (b) 0.01 to 1.0 equivalent of a polyhydric phenol and (c) 0.005 to 0.5 equivalent of an amine/epoxy adduct, the amine/epoxy adduct (c) being a reaction product of an aromatic polyepoxide with a polyoxyalkyleneamine and the compounds used for the preparation of the amine/epoxy adduct (c), namely the aromatic polyepoxide and the polyoxyalkyleneamine, being used in an equivalent ratio of 1:0.10 to 1:0.28.

The expression "equivalent ratio" is familiar to the expert. The basic concept behind the notion of the equivalent is that, for every substance participating in a reaction, the reactive groups involved in the desired reaction are taken into consideration. By indicating an equivalent ratio, it is possible to express the ratio which all the various reactive groups of the compounds (x) and (y) used bear to one another. In the context of the invention, a reactive group is understood to be the functional group and not the smallest possible reactive group. In the case of amines containing $NH_2$ groups, this means for example that the $NH_2$ group is meant, not an NH unit.

It is specifically pointed out that the teaching of the present invention differs from the teaching of the above-cited WO 96/20971 in the special equivalent ratio selected in the production of component (c) from polyepoxide and polyoxyalkylenediamine. According to WO 96/20971, the polyepoxide and the polyoxyalkylenediamine should be used in an equivalent ratio of 1:0.3 to 1:0.9; according to the teaching of the present invention, the polyepoxide and the polyoxyalkylenediamine should be used in an equivalent ratio of 1:0.10 to 1:0.28. An equivalent ratio of 1:0.15 to 1:0.25 is preferred.

So far as components (a), (b) and (c) and their reaction are concerned, reference is explicitly made to the observations in WO 96/20971. Accordingly, the disclosure of WO 96/20971 is expressly included in the disclosure of the present invention.

Epoxy resins (a) in the context of the present invention—and in accordance with the above-cited WO 96/20971 (cf. page 13, line 10 to page 16, line 13)—are understood to be polyglycidyl ethers of polyhydric phenols. These compounds have two or more epoxy groups and one or more aromatic rings each with six carbon atoms per molecule. Preferred polyhydric phenols are the compounds described under (b).

Polyhydric phenols (b) in the context of the present invention—and in accordance with the above-cited WO 96/20971 (cf. page 16, line 15 to page 17, line 18)—are understood to be compounds containing several hydroxyl groups which are covalently bonded to one or more aromatic rings each with six carbon atoms per molecule.

Examples of suitable compounds (b) are resorcinol, hydroquinone, 2,2-bis-(4-hydroxyphenyl)-propane (bisphenol A), isomer mixtures of dihydroxydiphenyl methane (bisphenol F), tetrabromobisphenol A, 4,4'-dihydroxydiphenyl cyclohexane, 4,4'-dihydroxy-3,3-dimethyldiphenyl propane, 4,4'-dihydroxydiphenyl, 4,4'-dihydroxybenzophenol, bis-(4-hydroxyphenyl)-1,1-ethane, bis-(4-hydroxyphenyl)-1,1-isobutane, bis-(4-hydroxyphenyl)-methane, bis-(4-hydroxyphenyl)-ether, bis-(4-hydroxy-phenyl)-sulfone etc. and the chlorination and bromination products of the above-mentioned compounds. Bisphenol A is most particularly preferred.

Bisphenol A

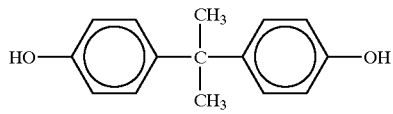

In the context of the present invention and in accordance with the above-cited WO 96/20971 (cf. page 7, line 22 to page 10, line 17), polyoxyalkyleneamines—one of the classes of compound for the production of component (c)—are understood to be amine compounds which contain both an aminic group and a water-solubilizing polyether group.

Suitable polyoxyalkyleneamines—hereinafter also referred to as component (c1)—are in particular mono-, di- and polyaminopolyalkylene oxide compounds. By this is meant that these compounds contain on the one hand one, two or more amino functions (NH or $NH_2$ functions) and, on the other hand, alkylene oxide units. The alkylene oxide units are, in particular, ethylene oxide, propylene oxide and butylene oxide, ethylene oxide and propylene oxide being particularly preferred. The compounds (c1) are substances at least partly soluble in water at 20° C.

The production of the compounds (c1) is known from the prior art and comprises the reaction of hydroxyfunctional compounds with alkylene oxides and subsequent conversion of the resulting terminal hydroxyl groups into amino groups.

So far as the reaction of hydroxyfunctional compounds with alkylene oxides is concerned, ethoxylation and propoxylation are of particular importance. The following procedure is usually adopted: in a first step, the required hydroxyfunctional compounds are contacted with ethylene oxide and/or propylene oxide and the resulting mixture is reacted in the presence of an alkaline catalyst at temperatures in the range from 20 to 200°C. Addition products of ethylene oxide (EO) and/or propylene oxide (PO) are obtained in this way. The addition products are preferably EO adducts or PO adducts or EO/PO adducts with the particular hydroxyfunctional compound. In the case of the EO/PO adducts, the addition of EO and PO may be carried out statistically or blockwise.

In one embodiment, substances with the general formula $R^1$-O-$R^2$-$CH_2CH(R^3)$-$NH_2$ are used as the compounds (c1). In this formula:

$R^1$ is a monofunctional organic group containing 1 to 12 carbon atoms which may be aliphatic, cycloaliphatic or aromatic, $R^2$ is a polyoxyalkylene group made up of 5 to 200 polyoxyalkylene units, more particularly EO and/or PO units, $R^3$ is hydrogen or an aliphatic radical containing up to 4 carbon atoms.

Particularly suitable representatives of the compounds (c1) for the purposes of the present invention are the "Jeffamines" known to the expert which are commercially available substances. One example is "Jeffamine 2070" which, according to the manufacturer Texaco, is produced by reacting methanol with ethylene oxide and propylene oxide and then converting the terminal hydroxyl groups of the intermediate product initially obtained into amine groups (cf. the above cited WO 96/20971, page 10, lines 12–15).

The compounds (c1) preferably have average molecular weights (number average Mn) of 148 to 5,000 and more particularly in the range from 400 to 2,000.

In the context of the present invention and in accordance with the above-cited WO 96/20971 (cf. page 10, line 19 to page 13, line 8), aromatic polyepoxides—one of the classes of compound for the production of component (c)—are understood to be aromatic compounds which contain two or more epoxy groups per molecule. The aromatic polyepoxides are also referred to hereinafter as component (c2).

The amine/epoxy adduct (c) may be used either as such, i.e. as a separately produced compound, in the production of the self-dispersing curable resins according to the invention (variant 1). However, it may also be formed in situ (variant 2). In the case of variant 1, therefore, the prepared components (a), (b) and (c) are used for the production of the resin according to the invention. In the case of variant 2, components (a), (b), (c1) and (c2) are used for the production of the resin according to the invention, (c) being formed in situ from (c1) and (c2).

The self-dispersible curable epoxy resins according to the invention may be combined with nonreactive organic solvents—more precisely co-solvents—and/or reactive diluents (cf. WO 96/20971 page 22, line 1 to page 24, line 13).

One advantage of the epoxy resins according to the invention lies in their excellent performance properties, more particularly their suitability for coating purposes. So far as the production of the epoxy resins according to the invention is concerned, one advantage is that the reaction does not require several steps, but may readily be carried out as a one-pot reaction.

The present invention also relates to aqueous dispersions containing one or more of the self-dispersible curable epoxy resins. The content of the epoxy resins according to the invention in these dispersions is between 40 and 70% by weight, based on the dispersion as a whole.

In many cases, aqueous dispersions containing the epoxy resins obtainable by the process according to the invention are distinguished by very small mean particle sizes of around 1000 nm or smaller and more particularly of about 800 nm or smaller. This leads to very favorable material properties of the coatings formed with these dispersions. Particularly favorable material properties are obtained when the mean particle size is below about 300 nm. The mean particle size is defined as the average of the particle sizes which is obtained by adding the values of n individual measurements and then dividing the total by n. For the purposes of the present invention, the mean particle sizes were determined using a "Coulter N4 Plus Submicron Particle Sizer" (manufacturer: Coulter, Miami, Fla. 33196, USA). This instrument uses the scattering of laser light at a heavily diluted dispersion for particle size determination. It performs a number of individual measurements and gives the mean particle size as the end result. The abovementioned values relate to scattering measurements at an angle of 90° relative to the incident laser beam.

The present invention also relates to a process for the production of self-dispersible curable epoxy resins in which (a) 1.0 equivalent of epoxy resin, (b) 0.01 to 1.0 equivalent of a polyhydric phenol and (c) 0.005 to 0.5 equivalent of an amine/epoxy adduct are reacted. The amine/epoxy adduct (c) is a reaction product of an aromatic polyepoxide with a polyoxyalkylenediamine, the compounds used for the preparation of the amine/epoxy adduct (c), namely the aromatic polyepoxide and the polyoxyalkyleneamine, being used in an equivalent ratio of 1:0.10 to 1:0.28. In a preferred embodiment, the reaction is carried out as a one-pot reaction.

The self-dispersible curable epoxy resins according to the invention are suitable in combination with suitable hardeners, more particularly the amine hardeners known to the relevant expert, and optionally other typical additives for the production of coatings, intermediate coatings, paints, molding compositions and curable pastes for various applications. For example, they may be used for the production of protective and/or decorative coatings on various, above all rough and porous substrates such as, for example, wood, mineral substrates (for example concrete and stone), glass, plastics (for example polyethylene, polypropylene), compost materials, ceramics and pretreated or non-pretreated metals. Their favorable properties also make the epoxy resins according to the invention eminently suitable for one-coat lacquering/painting. The adhering coating layer may remain unchanged as such although it may also serve as an intermediate layer, i.e. as a substrate for further coatings which in turn may consist of the same coating material or of another typical coating material.

Accordingly, the present invention also relates to the use of the self-dispersible curable epoxy resins according to the invention for the applications mentioned.

Aqueous dispersions containing the epoxy resins according to the invention are distinguished by good dilutability and favorable performance properties. Apart from the applications already mentioned, they are also suitable for use in electrodeposition painting. In addition, aqueous dispersions containing the epoxy resins according to the invention may also be used for the production of water-dilutable adhesives, as binders for textiles, organic and/or inorganic materials and as an additive in plastic cements.

EXAMPLES

General

The epoxy equivalent weight of a substance is the quantity of that substance in grams which contains 1 mole of oxirane rings.

A "Coulter N4 Plus Submicron Particle Sizer" (manufacturer: Coulter, Miami, Fla. 33196, USA) was used to determine the mean particle sizes. The measured values relate to scattering measurements at an angle of 90° relative to the incident laser beam.

The viscosity of the dispersions was determined at 20° C. using a Brookfield viscosimeter (spindle 4; 50 r.p.m.).

Example 1

Stage I: Preparation of the Solid Resin

Materials
1) 369.23 g Chemres E20 (bisphenol-A-based epoxy resin of Henkel SpA with an average epoxy equivalent weight of ca. 190 g)
2) 19.06 g Jeffamine M 600 (Huntsman)
3) 60.76 g Jeffamine M 2070 (Huntsman)
4) 105.33 g bisphenol A
5) 0.41 g triphenyl phosphine
6) 74.55 g ethoxypropanol Procedure Components 1) to 3) were successivey introduced into a reactor and heated for 2 hours to 125–135° C. Components 4) and 5) were then added and the reaction mixture was stirred for 5 hours to 140–160° C. Component 6) acting as solvent and viscosity adjuster was then added to the solid resin obtained and the mixture was homogenized. The yield amounted to 629.34 g. The entire substance was used to prepare an aqueous dispersion (see stage II).

Stage II: Preparation of the Solid Resin Dispersion

Materials
1) 629.34g substance from stage I
2) 86.89 g distilled water heated to 65° C.
3) 9.0 g $C_{12/14}$ fatty alcohol glycidyl ether
4) 271.86 g distilled water heated to 20° C.
5) 6.0 g ethylene glycol
6) 5.0 g Nopco DSX 1550 (polyurethane prepolymer in water/butyl diglycol; a product of Nopco)

Procedure

Component 1) was heated to 65° C. Component 2) was then added and the mixture was homogenized for 15 minutes at that temperature. After cooling to 40 to 45° C., the emulsion was tested (by removing a small sample of the emulsion and dissolving it in a large excess of water; the emulsion must finely disperse immediately and spontaneously in the water) to determine whether inversion of the emulsion type from w/o to o/w had taken place. This was the case. Component 3) was then added and the mixture was homogenized for 10 minutes, followed by the addition of component 4)—first slowly and then more quickly as the viscosity increased—and stirring for 15 minutes without cooling. Finally, component 5) was added, the mixture was homogenized and component 6) was then stirred in.

The dispersion was characterized as follows: the mean particle diameter was 800 nm, the viscosity 500 mPas and the epoxy equivalent weight 1100.

Example 2

Stage I: Preparation of the Solid Resin

Materials 1) 30.97 g Chemres E20 (bisphenol-A-based epoxy resin of Henkel SpA with an average epoxy equivalent weight of ca. 190 g)
2) 79.13 g Jeffamine M 2070 (Huntsman)
3) 292.62 g Chemres E20
4) 88.88 g bisphenol A
5) 0.35 g triphenyl phosphine
6) 62.89 g ethoxypropanol Procedure Components 1) to 2) were successivey introduced into a reactor and heated for 3 hours to 130° C. Components 3) to 5) were then added and the reaction mixture was stirred for 5 hours to 140–160° C. Component 6) acting as solvent and viscosity adjuster was then added to the solid resin obtained and the mixture was homogenized. The yield amounted to 554.85 g. The entire substance was used to prepare an aqueous dispersion (see stage 11).

Stage II: Preparation of the Solid Resin Dispersion

Materials 1) 554.85 g substance from stage I
2) 77.60 g distilled water heated to 50° C.
3) 8.06 g $C_{12/14}$ fatty alcohol glycidyl ether ("Rütapox Z8", a product of Rüttgers)
4) 242.83 g distilled water heated to 20° C.
5) 5.37 g ethylene glycol
6) 4.48 g Nopco DSX 1550 (polyurethane prepolymer in water/butyl diglycol; a product of Nopco)

Procedure

Component 1) was heated to 65° C. Component 2) was then added and the mixture was homogenized for 15 minutes at that temperature. After cooling to 45° C., the emulsion was tested (by removing a small sample of the emulsion and dissolving it in a large excess of water; the emulsion must finely disperse immediately and spontaneously in the water) to determine whether inversion of the emulsion type from w/o to o/w had taken place. This was the case. Component 3) was then added and the mixture was homogenized for 10 minutes, followed by the addition of component 4)—first slowly and then more quickly as the viscosity increased—and stirring for 15 minutes without cooling. Finally, component 5) was added, the mixture was homogenized and component 6) was then stirred in.

The dispersion was characterized as follows: the mean particle diameter was 800 nm, the viscosity 1800 mPas and the epoxy equivalent weight 1100.

Example 3

Stage 1: Preparation of the Solid Resin

Materials 1) 19.54 g Chemres E20 (bisphenol-A-based epoxy resin of Henkel SpA with an average epoxy equivalent weight of ca. 190 g)
2) 49.93 g Jeffamine M 2070 (Huntsman)
3) 285.01 g Chemres E20
4) 85.03 g bisphenol A
5) 0.34 g triphenyl phosphine
6) 60.17 g ethoxypropanol Procedure Components 1) to 2) were successivey introduced into a reactor and heated for 3 hours to 130° C. Components 3) to 5) were then added and the reaction mixture was stirred for 5 hours to 140–160° C. Component 6) acting as solvent and viscosity adjuster was then added to the solid resin obtained and the mixture was homogenized. The yield amounted to 500.02 g. The entire substance was used to prepare an aqueous dispersion (see stage 11).

Stage II: Preparation of the Solid Resin Dispersion

Materials 1) 500.02 g substance from stage I
2) 69.92 g distilled water heated to 50° C.
3) 7.26 g $C_{12/14}$ fatty alcohol glycidyl ether ("Rütapox Z8", a product of Rüttgers)
4) 218.80 g distilled water heated to 20° C.
5) 4.84 g ethylene glycol
6) 4.04 g Nopco DSX 1550 (polyurethane prepolymer in water/butyl diglycol; a product of Nopco)

Procedure

Component 1) was heated to 65° C. Component 2) was then added and the mixture was homogenized for 15 minutes at that temperature. After cooling to 45° C., the emulsion was tested (by removing a small sample of the emulsion and dissolving it in a large excess of water; the emulsion must finely disperse immediately and spontaneously in the water) to determine whether inversion of the emulsion type from w/o to o/w had taken place. This was the case. Component 3) was then added and the mixture was homogenized for 10 minutes, followed by the addition of component 4)—first slowly and then more quickly as the viscosity increased—and stirring for 15 minutes without cooling. Finally, component 5) was added, the mixture was homogenized and component 6) was then stirred in.

The dispersion was characterized as follows: the mean particle diameter was 910 nm, the viscosity 500 mPas and the epoxy equivalent weight 1100.

Example 4

Stage 1: Preparation of the Solid Resin

Materials 1) 30.04 g Chemres E20 (bisphenol-A-based epoxy resin of Henkel SpA with an average epoxy equivalent weight of ca. 190 g)
2) 36.42 g Jeffamine M 1000 (Huntsman)
3) 285.21 g Chemres E20
4) 86.63 g bisphenol A
5) 0.35 g triphenyl phosphine
6) 61.30 g ethoxypropanol Procedure Components 1) to 2) were successivey introduced into a reactor and heated for 3 hours to 130° C. Components 3) to 5) were then added and the reaction mixture was stirred for 5 hours to 140–160° C. Component 6) acting as solvent and viscosity adjuster was then added to the solid resin obtained and the mixture was homogenized. The yield amounted to 499.95 g. The entire substance was used to prepare an aqueous dispersion (see stage 11).

Stage II: Preparation of the Solid Resin Dispersion
Materials
1) 499.95 g substance from stage I
2) 69.92 g distilled water heated to 50° C.
3) 7.26 g $C_{12/14}$ fatty alcohol glycidyl ether ("Rütapox Z8", a product of Rüttgers)
4) 218.80 g distilled water heated to 20° C.
5) 4.84 g ethylene glycol
6) 4.04 g Nopco DSX 1550 (polyurethane prepolymer in water/butyl diglycol; a product of Nopco)

Procedure

Component 1) was heated to 65° C. Component 2) was then added and the mixture was homogenized for 15 minutes at that temperature. After cooling to 45° C., the emulsion was tested (by removing a small sample of the emulsion and dissolving it in a large excess of water; the emulsion must finely disperse immediately and spontaneously in the water) to determine whether inversion of the emulsion type from w/o to o/w had taken place. This was the case. Component 3) was then added and the mixture was homogenized for 10 minutes, followed by the addition of component 4)—first slowly and then more quickly as the viscosity increased— and stirring for 15 minutes without cooling. Finally, component 5) was added, the mixture was homogenized and component 6) was then stirred in.

The dispersion was characterized as follows: the mean particle diameter was 980 nm, the viscosity 1070 mPas and the epoxy equivalent weight 1040.

Example 5

Stage I: Preparation of the Solid Resin
Materials
1) 65.31 g Chemres E20 (bisphenol-A-based epoxy resin of Henkel SpA with an average epoxy equivalent weight of ca. 190 g)
2) 100.12 g Jeffamine M 2070 (Huntsman)
3) 19.35 g Jeffamine M 600 (Huntsman)
4) 617.17 g Chemres E20
4) 187.46 g bisphenol A
5) 0.73 g triphenyl phosphine
6) 112.50 g ethoxypropanol Procedure Components 1) to 3) were successivey introduced into a reactor and heated for 3 hours to 130° C. Components 4) to 6) were then added and the reaction mixture was stirred for 5 hours to 140–160°C. Component 7) acting as solvent and viscosity adjuster was then added to the solid resin obtained and the mixture was homogenized. The yield amounted to 1102.64 g. The entire substance was used to prepare an aqueous dispersion (see stage 11).

Stage II: Preparation of the Solid Resin Dispersion
Materials
1) 1102.64 g substance from stage I
2) 154.21 g distilled water heated to 50° C.
3) 10.0 g $C_{12/14}$ fatty alcohol glycidyl ether ("Rütapox Z8", a product of Rüttgers)
4) 482.54 g distilled water heated to 20° C.
5) 10.67 g ethylene glycol
6) 8.90 g Nopco DSX 1550 (polyurethane prepolymer in water/butyl diglycol; a product of Nopco)

Procedure

Component 1) was heated to 65° C. Component 2) was then added and the mixture was homogenized for 15 minutes at that temperature. After cooling to 45° C., the emulsion was tested (by removing a small sample of the emulsion and dissolving it in a large excess of water; the emulsion must finely disperse immediately and spontaneously in the water) to determine whether inversion of the emulsion type from w/o to o/w had taken place. This was the case. Component 3) was then added and the mixture was homogenized for 10 minutes, followed by the addition of component 4)—first slowly and then more quickly as the viscosity increased— and stirring for 15 minutes without cooling. Finally, component 5) was added, the mixture was homogenized and component 6) was then stirred in.

What is claimed is:

1. A self dispersible curable epoxy resin composition comprising a reaction product of:
    (a) 1.0 equivalent of epoxy resin;
    (b) 0.01 to 1.0 equivalent of polyhydric phenol; and
    (c) 0.005 to 0.5 equivalent of an amine/epoxy adduct formed by reacting:
        (i) an aromatic polyepoxide; and
        (ii) a polyoxyalkylenamine, in an equivalent ratio of from about 1:0.10 to 1:0.28.

2. The composition of claim 1 wherein the amine/epoxy adduct is formed by reacting the an aromatic polyepoxide and the polyoxyalkylenamine, in an equivalent ratio of from about 1:0.1 5 to 1:0.25.

3. An aqueous composition comprising the self-dispersible curable epoxy resin composition of claim 1.

4. The composition of claim 3 wherein the self-dispersible curable epoxy resin dispersed therein has a mean particle size of up to about 1000 nm.

5. The composition of claim 3 wherein the self-dispersible curable epoxy resin is present in the composition in an amount of from about 40 to 70% by weight, based on the weight of the composition.

6. A process for making a self-dispersible curable epoxy resin comprising:
    (a) providing 1.0 equivalent of epoxy resin;
    (b) providing 0.01 to 1.0 equivalent of polyhydric phenol;
    (c) providing 0.005 to 0.5 equivalent of an amine/epoxy adduct formed by reacting:
        (i) an aromatic polyepoxide; and
        (ii) a polyoxyalkylenamine, in an equivalent ratio of from about 1:0.10 to 1:0.28; and
    (d) reacting (a)–(c) to form the self-dispersible curable epoxy resin.

7. The process of claim 6 wherein the amine/epoxy adduct is formed by reacting the an aromatic polyepoxide and the polyoxyalkylenamine, in an equivalent ratio of from about 1:0.15 to 1:0.25.

8. The process of claim 6 wherein the self-dispersible curable epoxy resin, when dispersed in water, has a mean particle size of up to about 1000 nm.

9. The process of claim 6 wherein the self-dispersible curable epoxy resin is formed using a one-pot reaction.

10. The product of the process of claim 6.

11. The product of the process of claim 7.

12. The product of the process of claim 8.

13. The product of the process of claim 9.

* * * * *